United States Patent
Beaverson et al.

(10) Patent No.: US 6,894,085 B2
(45) Date of Patent: May 17, 2005

(54) BARRIER MATERIAL WITH NANOSIZE METAL PARTICLES

(75) Inventors: Neil Beaverson, Vadnais Heights, MN (US); Willard Wood, Arden Hills, MN (US)

(73) Assignee: Cellresin Technologies, LLC, St. Paul, MN (US)

( * ) Notice: Subject to any disclaimer, the term of this patent is extended or adjusted under 35 U.S.C. 154(b) by 0 days.

(21) Appl. No.: 10/243,620

(22) Filed: Sep. 13, 2002

(65) Prior Publication Data

US 2003/0129403 A1 Jul. 10, 2003

Related U.S. Application Data

(60) Provisional application No. 60/322,637, filed on Sep. 17, 2001.

(51) Int. Cl.[7] .................................................. C08J 6/10
(52) U.S. Cl. ........................ 523/102; 524/48; 524/398; 524/432
(58) Field of Search ............................... 523/102, 105; 523/122; 524/432, 398

(56) References Cited

U.S. PATENT DOCUMENTS

| | | | | |
|---|---|---|---|---|
| 5,429,628 A | * | 7/1995 | Trinh et al. | 604/359 |
| 5,534,582 A | | 7/1996 | Krause et al. | |
| 5,776,842 A | * | 7/1998 | Wood et al. | 442/394 |
| 6,403,653 B1 | * | 6/2002 | Hobson et al. | 514/759 |
| 6,528,013 B1 | * | 3/2003 | Trinh et al. | 422/5 |
| 2002/0192366 A1 | * | 12/2002 | Cramer et al. | 427/180 |

FOREIGN PATENT DOCUMENTS

| | | |
|---|---|---|
| EP | 0 318 196 | 5/1989 |
| JP | 59145037 | 8/1984 |
| WO | WO 93/10174 | 5/1993 |
| WO | WO 96/00260 | 1/1996 |
| WO | WO 96/40412 | 12/1996 |
| WO | WO 99/32546 | 7/1999 |

* cited by examiner

*Primary Examiner*—Katarzyna Wyrozebski
(74) *Attorney, Agent, or Firm*—Henry M. Feiereisen; Ursula B. Day (57) ABSTRACT

The incorporation of nanosized metal particles into cyclodextrin-containing material leads to a "reactive" barrier material having excellent barrier properties. Also, it has been found that the presence of nanosized metal or metal alloy particles in a barrier material such as thermoplastic material, wherein said material comprises cyclodextrin derivatives, may be advantageous in achieving excellent barrier properties. The barrier material of the present invention may provide improved barrier resistance to a variety of permeants and/or impurities. The diffusion of volatile substances through the barrier material may be prevented by adding compatible derivatized cyclodextrin and nanosized metal particles to the material used. Accordingly, the inventive material also is suitable for many applications including food-contact packaging, flexible packaging to dispose of adult and baby diapers, incontinent products, hospital and household waste and also for packaging pharmaceutical products, medical devices and dental materials.

20 Claims, 6 Drawing Sheets

PN 32040 Micro Zn C

SEM micrograph of film #3 (microzinc)

Fig. 1   SEM micrograph of film #3 (microzinc)

Fig. 2   SEM micrograph of film #2 (nanozinc)

Figure 3. Energy Dispersive x-ray spectra of zinc particle (Film #3) in Figure 1.

Figure 4. Typical Permeation profile with lag time $\theta$, steady-state and equilibrium concentration $p_2 = p_1$.

Figure 5. Closed-Volume glass permeation cells with aluminum sealing rings and film.

Figure 6. Chloroacetic acid concentrations in jar headspace versus time for Film #2 (nanozinc) and Film #3 (microzinc) with least squares linear regression and linear regression line equations.

Figure 7. Hexanal closed-volume permeation profiles for Film #1, Film #2, Film #3 and Film #4 as a function of time. Permeation temperature 22°C and all film thicknesses 50 μm.

Figure 8. Butyric acid closed-volume permeation profiles for Film #1, Film #2, Film #3 and Film #4 as a function of time. Permeation temperature 22°C and all film thicknesses 50 μm.

Figure 9. Isovaleric acid closed-volume permeation profiles for Film #1, Film #2, Film #3 and Film #4 as a function of time. Permeation temperature 22°C and all film thicknesses 50 μm.

Figure 10. Closed-volume static permeation cells for malodour vapor permeation sensory testing.

Fig. 11 Closed-volume Malodour permeation profiles for Film #1, Film #2, Film #3 and Film #4 as a function of time. Permeation temperature 22°C and all film thickness 50μm.

US 6,894,085 B2

BARRIER MATERIAL WITH NANOSIZE METAL PARTICLES

CROSS-REFERENCES TO RELATED APPLICATIONS

This application claims the benefit of prior filed provisional application, Appl. No. 60/322,637, filed Sep. 17, 2001, pursuant to 35 U.S.C. 119(e), the subject matter of which is incorporated herein by reference.

FIELD OF THE INVENTION

The present invention relates to materials having improved barrier properties and a process and method for the manufacture of said materials. In particular, the present invention relates to barrier materials for packaging, storing or wrapping articles as for example soiled disposable or washable diapers releasing volatile substances, especially malodours. The present invention also relates to plastic-based barrier materials for trapping or catching off-odours or off-flavours, especially light-induced off-odours and off-flavours, during the storage of e.g. drinks or food in packages like plastic bottles or coated paperboard cartons.

BACKGROUND INFORMATION

Much attention has been directed to the development of materials having improved barrier properties with respect to e.g. contaminants. In the field of packing a variety of materials are used. Especially materials comprising polymeric or thermoplastic compounds are widespread and used in the form of e.g. films, coatings, semi-rigid or rigid sheets or containers.

Improving barrier properties, especially organic vapor barrier properties is an important goal for manufacturers of materials. One main field of application is in the provision of plastic-based materials used to package e.g. food products including liquid and solid products, products which should be protected from the entry of harmful substances or products emitting flavoring substances or harmful and/or undesired volatiles over their storage lives.

Mobile or volatile, organic contaminant material or substances can derive from the environment, but also from the material as for example from a printing chemical, a coating chemical or from any contaminant in recycled material and can of course derive from the product to be wrapped or packaged. A permeant, contaminant or volatile in the meaning of the present invention is a substance that can exist in the atmosphere at a substantial detectable concentration and can be transmitted through a known material. A large variety of permeants or volatiles are known.

A problem known for a long time relates to materials or containers for temporarily storing soiled diapers, incontinent products, medical dressings, sanitary napkins, etc. Especially the temporary storage of soiled disposable or washable diapers prior to final disposal or laundering represents a long-felt problem. The malodours emanating from soiled diapers are highly undesirable.

Usually soiled diapers are stored in a lockable container or resealable garbage bag, which is e.g. placed in the nursery, before transporting them to an outdoor storage vessel. It is widespread to use plastic diaper pails having a tight lid for the temporary storage of the soiled diapers. Said bags or diaper pails reduce the release of the unpleasant odours when sealed. However, the barrier properties of e.g. thermoplastic garbage bags known in the art are limited and are not satisfactory.

Moreover, upon opening the bag or container, the malodours escape into the area giving an extremely unpleasant sensation to the person attempting to place another soiled diaper into the same. Also, especially diaper pails tend to retain the malodours even after the diapers have been removed. In other words, the plastic materials commonly used for the manufacture of such bags or diaper pails tend to temporarily adsorb the odours or volatile substances emitting from the diapers. Accordingly, the garbage bag or container by itself becomes a source of malodours regardless whether diapers are contained or not.

Similar problems are observed with respect to the diapers itself, since they usually may have very efficient moisture absorbing properties but show no or very low barrier properties with respect to the unpleasant odours emitting from a soiled diaper. Accordingly, a prior art problem is in the inability to provide a suitable construction that would keep moisture away from the surface of the diaper which comes into contact with the infant's skin and avoids at least partly the release of smelling volatile substances.

Disposable diapers have met with increased commercial acceptance in recent years and many different constructions have been proposed and used. Usually, the moisture absorbing functions are accomplished by a multilayer diaper comprising a fibrous facing layer which is to be brought into contact with the infant's skin, a layer of an absorbing material as for example a highly porous, loosely compacted cellulosic material and a moisture-impervious backing sheet.

The facing layer often is made of a porous material and its fibers have less wetability for water than the fibers of the absorbing material, resulting in a tendency for liquid to flow from the facing layer into the absorbing unit. Liquid which might pass through the absorbing unit during discharge (when flow is rapid) is held back by an impervious backing sheet or film for sufficient time to permit absorption to take place. However, the outer or backing layer does not prevent volatile substances or odours from permeating through said layer.

The problems indicated above with respect to soiled diapers apply to the same extent to other materials or containers e.g. for temporarily storing incontinent products, medical dressings, sanitary napkins or any other article emitting volatile substances. Similar problems also relate to materials or containers for storing drinks or food. Ideally, the materials or containers should prevent any substances which would affect aroma or taste of the content of the containers from adulterating the food or drink in the container. Moreover, it is clear that the barrier material should not have or release odour of its own which it can impart to the contents of the container or package. Changes of the taste of the container's contents are often due to light-induced aroma changes.

Especially gable-top cartons and plastic bottles are widespread in the food packaging industry. Liquid-packaging carton stock (paperboard) is typically coated on both sides with polyethylene. For food carton applications, the food product contact polymer (e.g., LDPE and LLDPE, and occasionally HDPE) is extrusion-coated onto the paperboard. The extrusion coating can be a single extrusion layer. Modern gable-top cartons retain the simple carton geometry but include technology refinements acquired over 60 years of development and commercial use. Today, the carton can have a plurality of layers specially engineered comprising an inner barrier layer of amorphous nylon or EVOH and outer layers of heat sealable olefin polymers. LDPE is frequently used as the product contact layer due to its excellent sealing properties, low-cost and minimal off-flavor contribution.

Serious problems relate to materials or containers for storing dairy products since they have a characteristic smooth, bland taste and soft flavor, so that the presence of an off-flavor or off-odor is readily noticeable. Light-induced off-flavors make milk products less acceptable to consumers. Clear plastic milk bottles, and to a lesser extent gable-top polyethylene coated paperboard cartons, in the presence of light and naturally occurring riboflavin or cysteine react with oxygen to form a series of sulfur containing compounds (methyl mercaptan, hydrogen sulfide, dimethyl sulfide and dimethyl disulfide).

In WO 97/33044 the use of cyclodextrin in rigid or semi-rigid cellulosic sheets is disclosed. The cyclodextrin acts as a barrier or a trap for contaminants. The barrier properties of the material disclosed in WO 97/33044 are based on entrapment of the respective permeants in the internal hydrophobic space of the cyclodextrin molecule. The cyclodextrin material is generally used in the form of a compatible, derivatized cyclodextrin. According to WO 97/33044 the preferred cyclodextrin is a derivatized cyclodextrin having at least one substituent group bonded to the cyclodextrin molecule.

Moreover, it is known from WO 97/30122 that the barrier properties of a thermoplastic polymer can be improved by forming a barrier layer with a dispersed compatible cyclodextrin derivative in the polymer.

WO 93/10174 is directed to thermoplastic films containing one or more metal powders selected from aluminium powder, magnesium powder, zinc powder and manganese powder. The application is directed to a thermoplastic film which is characterized in that the film comprises at least 0.1 wt. %, preferably 0.5 to 6 wt. %, based on the total weight of the mixture of thermoplastic and filler, of at least one metal powder, selected from the group consisting of aluminium powder, magnesium powder, manganese powder and mixtures thereof. According to WO 93/10174 the average particle size of the metal powders is in the range of 5–20 μm In none of the aforementioned documents of the prior art, barrier materials containing modified cyclodextrin in combination with another reactive or trapping substance incorporated into a corresponding barrier material are disclosed.

SUMMARY OF THE INVENTION

According to an exemplary embodiment of the present invention, a material is provided, the material comprising
 (a) a matrix material; and
 (b) dispersed in the matrix material,
  an effective absorbing amount of a cyclodextrin material; wherein the cyclodextrin is free of an inclusion complex compound and the cyclodextrin comprises an α-cyclodextrin, a β-cyclodextrin, a γ-cyclodextrin or mixtures thereof, having pendant moieties or substituents that render the cyclodextrin compatible with the matrix material, and
  nanosized particles of zinc or similar reacting metal or metal alloy.

It is believed that the material according to this exemplary embodiment of the present invention has improved barrier properties.

DETAILED DESCRIPTION

According to an exemplary embodiment of the present invention, it has now been found that the incorporation of nanosized metal particles into cyclodextrin-containing material may lead to a "reactive" barrier material having excellent barrier properties. More specifically, it is believed that the presence of nanosized metal or metal alloy particles in a barrier material, such as a thermoplastic material and or a thermoplastic film, wherein said material comprises cyclodextrin derivatives, may be advantageous in achieving excellent barrier properties. A possible metal is zinc.

"Nanosized particles" in the meaning of the present invention preferably are particles having an average diameter in the range of 10 to 250 nm, more preferably in the range of 40 to 120 nm and most preferred in the range of 60 to 100 nm. It has been found in the present invention that the use of particles having an average diameter of more than 1000 nm may be disadvantageous. For example, the incorporation of microsized particles into a thermoplastic film having a thickness in the range of 10 to 20 μm may lead to perforation of the film, and may cause surface imperfections or small pinholes.

An exemplary embodiment of the present invention is directed to the use of zinc particles, i.e. particles substantially consisting of metallic zinc, in unreacted form. However, also the use of similar reacting metal or metal alloy particles instead of or in addition to zinc particles is contemplated according to the present invention. It is preferred that the zinc or other metal particles are essentially free of corresponding oxides.

According to an exemplary embodiment of the present invention, the cyclodextrin material to be used may have at least a low moisture content, such as a moisture content of about 1 wt.-%, based on the cyclodextrin material.

According to an exemplary embodiment of the present invention, it has been found that the inventive barrier materials containing cyclodextrin derivatives and nanosized metal particles are particularly suitable for the use as or the manufacture of materials or containers for temporarily storing soiled diapers, incontinent products, medical dressings, sanitary napkins, etc., since the material functions as an effective barrier to permeants, especially reactive permeants, emitting from e.g. soiled diapers.

Volatiles or permeants emitting from e.g. soiled diapers comprise low molecular organic acids, organic sulfides and thiols, amines, ammonia and aromatic alcohols. Most of these compounds have human sensory thresholds in the low parts per billion.

The inventive barrier materials according to exemplary embodiments of the present invention may prevent the unpleasant odours or volatiles from diffusing or permeating through the barrier and are also able to at least partly fix or complex the diffusing permeants permanently. Accordingly, a corresponding barrier film, garbage bag or container by itself preferably does not emit malodours.

Moreover, it has been found in an exemplary embodiment of the present invention that the inventive barrier materials or barrier layers containing nanosized metal particles and cyclodextrin dispersed into a suitable food-contact and especially milk-contact layer of a bottle or carton can trap light-induced off-flavor compounds formed in the milk, thereby improving the flavor and increasing the storage life. As milk off-flavors solubilize in the contact polymer layer, the metal reactive off-flavors (e.g., hydrogen sulfide, dimethyl sulfide and dimethyl disulfide) react with nanosized metal and are complexed by cyclodextrin preventing their transport later in the storage life out of the contact layer polymer back into the milk.

A barrier material according to an exemplary embodiment of the present invention may e.g. be a film, a coating, a semi-rigid or rigid sheet or also a container, as for example a diaper pail having at least a layer or coating consisting of the inventive material having improved barrier properties. The inventive material having improved barrier properties may be used in combination with any other material. For example, the inventive barrier material may be coextruded or laminated with polymers providing a two layer film, a coated monolayer, bilayer or multilayer film having one or more coatings on a surface or both surfaces. Also, according to another exemplary embodiment of the present invention, the material having improved barrier properties may be a thermoplastic material, such as a thermoplastic material in the form of a thermoplastic film, a sealing liner, a thermoplastic cap or a rigid container.

The matrix material according to an exemplary embodiment of the present invention may be a thermoplastic material including polymers made from monomers including ethylene, propylene, butylene, butadiene, styrene and others. Moreover, such thermoplastic polymeric materials include poly(acrylonitrile-co-butadiene-co-styrene) polymers, acrylic polymers such as the polymethylmethacrylate, poly-n-butyl acrylate, poly(ethylene-co-acrylic acid), poly(ethylene-co-methacrylate), etc.; cellophane, cellulosics including cellulose acetate, cellulose acetate propionate, cellulose acetate butyrate and cellulose triacetate, etc.; fluoropolymers including polytetrafluoroethylene (Teflon®), poly(ethylene-co-tetrafluoroethylene) copolymers, (tetrafluoroethylene-co-propylene) copolymers, polyvinyl fluoride polymers, etc., polyamides such as nylon 6, nylon 6,6, etc.; polycarbonates; polyesters such as poly(ethylene-co-terephthalate), poly(ethylene-co-1,4-naphthalene dicarboxylate), poly(butylene-co-terephthalate); polyimide materials; polyethylene materials including low density polyethylene; linear low density polyethylene, high density polyethylene, high molecular weight high density polyethylene, etc.; polypropylene, biaxially oriented polypropylene; polystyrene, biaxially oriented polystyrene; vinyl films including polyvinyl chloride, (vinyl chloride-co-vinyl acetate) copolymers, polyvinylidene chloride, polyvinyl alcohol, (vinyl chloride-co-vinylidene dichloride) copolymers, specialty films including polysulfone, polyphenylene sulfide, polyphenylene oxide, liquid crystal polyesters, polyether ketones, polyvinylbutyral, etc.

According to a another exemplary embodiment of the present invention, the matrix material may be a thermoplastic material, such as a thermoplastic film, wherein the material comprises high density polyethylene (HDPE), low density polyethylene (LDPE) and/or linear low density polyethylene (LLDPE) and a compound selected from the group comprising polyester, polyamides and ethylene-vinylalcohol-copolymers. A polyamide which may be used is Nylon®.

According to another exemplary embodiment of the present invention the matrix material comprises a cellulosic material, preferably a web or a layer comprising a continuous array of randomly oriented cellulosic fiber.

Cellulosic materials are comprised of bonded, small discrete cellulosic fibers. Such fibers are typically held together by secondary bonds that, most probably, are hydrogen bonds. To form a cellulosic sheet, fiber is formed into a rough, web or sheet on a fine screen from a water suspension or dispersion of fiber, combined with fiber additives, pigments, binder material, secondary binder materials or other components. Cellulosic materials can be made both from primary sources of fibers and from secondary or recycled fibrous materials. Recycled material inherently contains recycled organic material such as inks, solvents, coatings, adhesives, residue from materials the fiber source contacted and other sources of material.

According to another exemplary embodiment of the present invention, a "reactive" barrier film may be provided, the film containing nanosized zinc particles having an average diameter in the range between 60 and 100 nm, an effective absorbing amount of a cyclodextrin material, preferably an acetylated cyclodextrin material, wherein the matrix material comprises LDPE, LLDPE and HDPE. Said "reactive" barrier film may provide excellent barrier properties and may be particularly suitable for the manufacture of bags as for example garbage bags for the temporarily storage of soiled diapers. The thickness of the resulting barrier film may be in the range of 5 and 65 µm, or in the range between 10 and 50 µm.

In the meaning of the present invention a film also can be a coating laminated to another film sheet or material. According to another embodiment of the present invention, a container, such as a plastic diaper pail having a tight lid for the temporary storage of soiled diapers is provided which consists of the inventive barrier material or is coated with at least one film or layer of the barrier material.

According to another embodiment of the present invention disposable diapers having inventive barrier material according to exemplary embodiments of the present invention are provided. It is possible to apply a coating or film of the inventive barrier material onto the outer or backing layer of a disposable diaper in order to prevent or reduce the emission of malodours.

According to another exemplary embodiment of the present invention also food-contact packages, especially plastic coated paperboard cartons or bottles, having inventive barrier material are provided. It is possible to apply a coating or film of the inventive barrier material onto the inner side of a bottle or carton in order to trap off-flavours or off-odours.

It is believed that it is an additional benefit of the inventive barrier materials according to the present invention that the zinc particles dispersed in the matrix material have anti-microbial properties and thus provide anti-microbial properties to the material or film.

The barrier materials of the present invention may provide improved barrier resistance to a variety of permeants and/or impurities. It is believed that the diffusion of volatile substances through the barrier material is prevented by adding compatible derivatized cyclodextrin and nanosized metal particles to the material used. Accordingly, the inventive material also may be suitable for many applications including food-contact packaging, flexible packaging to dispose of adult and baby diapers, incontinent products, hospital and household waste and also for packaging pharmaceutical products, medical devices and dental materials.

The preferred cyclodextrin derivative may be selected, based on the functional group compatibility with the matrix material, the thermal stability of the cyclodextrin material and the cyclodextrin's ability to form an inclusion complex with volatile substances. The cyclodextrin derivative may contain one substituent on the single primary carbon hydroxyl and/or one substituent on one or both of the secondary carbon hydroxyls.

Cyclodextrin is commonly produced by a highly selective enzymatic synthesis. It generally consists of six, seven, or eight glucose monomers arranged in a donut shaped ring, which are denoted alpha-, beta-, or gamma-cyclodextrin, respectively. The specific coupling of the glucose monomers gives the cyclodextrin a rigid, truncated conical molecular structure with a hollow interior of a specific volume. This internal cavity is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

According to an aspect of the present invention, the cyclodextrin is based on an alpha-cyclodextrin (alpha-CD), a beta-cyclodextrin (beta-CD), a gamma-cyclodextrin (gamma-CD) or mixtures thereof. A cyclodextrin derivative is, inter alia, selected based on the functional group compatibility with the matrix material on one hand and the cyclodextrin's ability to form an inclusion complex with targeted substances on the other hand.

Accordingly, a first requirement is compatibility with the thermoplastic or cellulosic material as well as thermal stability in the manufacturing process. "Compatible" means that preferably the cyclodextrin material can be uniformly dispersed into the matrix material, can retain the ability to trap or complex permeant materials or polymer impurity, and can reside in the polymer without substantial reductions in barrier properties.

Second, the cyclodextrin's internal cavity size (i.e., α, β, γ) must be considered. Any derivative functional group modification must be suitable for forming an inclusion complex with targeted volatiles or impurities. To achieve a specific result, providing more than one cavity size and functional group may be necessary. For example, blends of α and/or β that contain γ-cyclodextrin have greater complexation efficiencies for some volatile substances than blends without γ-cyclodextrin. Computational modelling indicates that the type and number of functional groups on the ring provide different complexation energies for specific ligands (i.e., complexed substances). These complexation energies ($\Delta E^{steric}$ and $\Delta E^{electrostatic}$) can be calculated for a specific derivative, cavity size and ligand. Hence, inclusion complexation is predictable to some extent. For example, the inventors found out that acetylated α-cyclodextrin, β-cyclodextrin and acetylated γ-cyclodextrin are very effective cyclodextrin derivatives for improving the barrier properties of the inventive barrier material.

The compatible cyclodextrin derivative according to the present invention is a compound substantially free of an inclusion complex. For this invention, the term "substantially free of an inclusion complex" means that the quantity of the dispersed cyclodextrin material in the matrix material contains a large fraction having cyclodextrin free of a contaminant, a permeant or other inclusion compound in the interior of the cyclodextrin molecule. A cyclodextrin compound is typically added and blended in the matrix without any inclusion compound but some complexing can occur during manufacture.

In principle, the cyclodextrin derivative which may be preferable according to an exemplary embodiment of the present invention may contain one substituent on the single primary carbon hydroxyl and one substituent on one or both of the secondary carbon hydroxyls. Because of the geometry of the cyclodextrin molecule, and the chemistry of the ring substituents, the hydroxyl groups are not equal in reactivity. However, with care and effective reaction conditions, the cyclodextrin molecule can be reacted to obtain a derivatized molecule having a certain number of hydroxyl groups derivatized with a single substituent type. Further directed synthesis of a derivatized molecule with two different substituents or three different substituents is also possible. These substituents may be placed at random or directed to a specific hydroxyl. For the purposes of this invention, a broad range of pendant substituent moieties can be used on the molecule. These derivatized cyclodextrin molecules can include alkyl ether, silyl ether, alkyl ester, including cyclodextrin esters such as tosylates, mesylate and other related sulfo derivatives, hydrocarbyl-amino cyclodextrin, alkyl phosphono and alkyl phosphato cyclodextrin, imidazoyl substituted cyclodextrin, pyridine substituted cyclodextrin, hydrocarbyl sulphur containing functional group cyclodextrin, silicon-containing functional group substituted cyclodextrin, carbonate and carbonate substituted cyclodextrin, carboxylic acid and related substituted cyclodextrin and others.

Acyl groups that may be used as compatibilizing functional groups include acetyl, propionyl, butyryl, trifluoroacetyl, benzoyl and acryloyl groups. The formation of such groups on the hydroxyls of the cyclodextrin molecule involve well known reactions. The acylation reaction can be conducted using the appropriate acid anhydride, acid chloride, and well known synthetic protocols.

Cyclodextrin materials may also be reacted with alkylating agents to produce an alkylated cyclodextrin. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl(4-methylbenzene sulfonyl), mesyl (methane sulfonyl) or other related alkyl or aryl sulfonyl forming reagents may also be used in manufacturing compatibilized cyclodextrin molecules.

Sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary and secondary hydroxyl. The sulfonyl chloride is used at appropriate mole ratios depending on the number of target hydroxyl groups in the molecule requiring substitution. Sulfonyl groups can be combined with acyl or alkyl groups.

The sulfonyl derivatized cyclodextrin molecule may be used to generate the amino derivative from the sulfonyl group substituted cyclodextrin molecule via nucleophilic displacement of the sulfonate group by an azide-ion. The azido derivatives are subsequently converted into substituted amino compounds by reduction. Large numbers of these azido or amino cyclodextrin derivatives have been manufactured. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group.

The cyclodextrin molecule also can be substituted with heterocyclic nuclei including pendent imidazole groups, histidine, imidazole groups, pyridino and substituted pyridino groups.

Cyclodextrin derivatives may be modified with sulfur containing functional groups to introduce compatibilizing substituents onto the cyclodextrin. Apart from the sulfonyl acylating groups mentioned above, sulfur containing groups manufactured based on sulfhydryl chemistry can be used to derivatize cyclodextrin. Such sulfur containing groups include methylthio (—SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Cyclodextrin with derivatives formed using silicone chemistry can contain compatibilizing functional groups.

Cyclodextrin derivatives with functional groups containing silicone, herein called silicon ether, can be prepared. Silicone groups generally refer to groups with a single substituted silicon atom or a repeating silicone-oxygen backbone with substituent groups. Typically, a significantly proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this invention the simple silicone containing substituent moieties are preferred including trimethylsilyl, mixed methyl-phenyl silyl groups, etc.

In exemplary embodiments of the present invention the cyclodextrin material comprises substituents having a silyl ether group, an alkyl ether group and/or an alkyl ester group. According to further exemplary embodiments of the present invention, the alkyl ester substituents may comprise acetyl moieties, propyl moieties and/or butyl moieties, the alkyl ether substituents may comprise methyl moieties, ethyl moieties and/or propyl moieties and the silyl ether substituents may comprise methyl moieties, ethyl moieties, propyl moieties and/or butyl moieties.

According to another exemplary embodiment of the present invention, the amount of cyclodextrin derivative in the matrix material preferably is in the range from about 0.01 to 5 wt-%, or from about 0.1 to 1 wt-%, based on the matrix material.

According to another exemplary embodiment of the present invention, the amount of zinc or similar reacting metal or metal alloy in the matrix material preferably is in the range from about 0.01 to 5 wt-% or from about 0.025 to 0.50 wt-%, based on the matrix material.

Polymers and cellulosic materials used in this invention may also contain other additives, which do not adversely affect the performance of the cyclodextrin, such as catalysts, stabilizers, processing aids, fillers, pigments, dyes and antioxidants.

Films are generally regarded as being 0.25 millimeters (mm) or less, typically 0.01 to 0,20 mm thick. Sheet may range from about 0.25 mm to several centimeters typically 0.3 to 3 mm in thickness. Film or sheet can be used in combination with other sheet, structural units, etc. through lamination. Important properties include tensile strength, elongation, stiffness, tear strength and resistance; optical properties including haze, transparency; chemical resistance such as water absorption and transmission of a variety of permeant materials including water vapor and other permeants; electrical properties such as dielectric constant; and permanence properties including shrinkage, cracking, weatherability, etc.

According to the present invention it is also contemplated to apply coating compositions containing a matrix material comprising inventive cyclodextrin derivatives and nanosized zinc particles for improving the barrier properties of the coated article. Coating machines commonly apply a liquid composition containing a film forming material, additives that can help form and maintain the coating composition along with the effective amount of the substituted cyclodextrin material and nanosized metal particles.

According to another exemplary embodiment of the present invention the modified cyclodextrin and the nanosized zinc or similar reacting metal is dispersed in a thermoplastic material. The resulting barrier material can be a homogeneous material consisting of one single layer. In the present invention it is also contemplated to provide or manufacture structured barrier materials, e.g. by coextrusion or laminating, thereby providing a two layer film, a coated monolayer, bilayer or multilayer film or a paperboard-foil-plastic composite materials having one or more coatings on a surface or on both surfaces.

If the matrix material is a thermoplastic material, the inventive barrier material comprising at least one thermoplastic polymer, a modified cyclodextrin and nanosized zinc or similar reacting metal can be created e.g. by the following procedure:

In a first step a cyclodextrin containing thermoplastic material is prepared by physically mixing and dispersing the minor constituent, i.e. modified cyclodextrin into the major constituent, i.e. the polymer, e.g. by extrusion. Suitable extrusion techniques include the so-called "direct incorporation" and "masterbatch addition". In either method it is possible to use twin-screw co-rotating segmented barrel extruders. Of course it is also possible to use counter rotating or single screw extruders for mixing or dispersing the cyclodextrin material into the polymeric material. It is clear that the modified cyclodextrin may be added individually or in combination with other suitable additives or adjuvants.

After mixing or dispersing the cyclodextrin material into the polymeric material, the nanosized zinc particles are dispersed in the resulting molten plastic. The reactive zinc particles to be added usually are dispersed in a mineral oil to protect the zinc from oxygen and moisture. The mineral oil is stripped from the plastic e.g. in the extruder using heat and vacuum. The resulting material is e.g. pumped out of the extruder and pelletized.

However, it is also possible to add the zinc or metal particles to the matrix material and subsequently add the cyclodextrin material in order to obtain barrier materials according to an exemplary embodiment of the present invention.

Of course, thermoplastic materials can be formed into barrier films using a variety of processes including blown thermoplastic extrusion, linear biaxially oriented film extrusion and by casting from molten thermoplastic resin, monomer or polymer (aqueous or organic solvent) dispersion. These methods are well known manufacturing procedures.

The foregoing discussion illustrates various embodiments of the application and barrier properties of sealing compounds and closure elements of the invention. The following examples and data further exemplify the invention.

Micro- and Nano-size Zinc Masterbatch Compounding

A segmented barrel (nine barrels), co-rotating compounding extruder (Warner Pfleiderer Corporation ZSK-30mm) was configured with an up-stream feed zone for film-grade high density polyethylene (HDPE) and triacetyl alpha cyclodextrin. A weight loss feeder is used to deliver HDPE into the first barrel. A second micro weight loss feeder delivers cyclodextrin into the first barrel at 1.82 lbs./hour. The two materials are then melted and mixed with dispersive and distributive mixing followed by a melting seal. Compounded material was extruded at 23.6 kg per hour with a melt temperature of 270° C. The screws were rotated at 400 rpm at 90% torque. Next, a zinc mixture is introduced through an injection nozzle using a low injection rate pump (Ministatic Pump manufactured by Manostatic) into a low degree of fill section of the screw downstream in barrel 4. A melt seal prior to zinc injection isolates the injection zone from the atmosphere insuring only melted material is in contact with the zinc mixture. The zinc mixture (pumped at 82.5 grams/hr) containing 0.467 grams Zn/milliliter of mineral oil is then incorporated using gear-mixing elements. The material passes through a devolatilization zone (operated at a vacuum of 660 mm Hg) before exiting through a four-hole strand die. The strands pass through a water bath and two air wipes before entering the strand cutter. The finished pellets are placed into a nitrogen purged Mylar/foil composite bag heat sealed with a bag sealer to prevent atmospheric contamination until use. Two masterbatches (zinc plus cyclodextrin) were produced using this compounding method.

Masterbatch formulation #1 contained 95.15% HDPE, 0.35% nano-size particle zinc (80–100 nm) and 3.5% triacetyl alpha cyclodextrin. Masterbatch formulation #2 contained 95.15% HDPE, 0.35% micro-size particle zinc (average particle size 9,790 nm) and 3.5% triacetyl alpha cyclodextrin. The micro- and nano-zinc materials were obtained from Aldrich Chemical and triacetyl alpha cyclodextrin was manufactured by Wacker Biochem Corporation. The hexane solvent in the nanozinc material was exchanged with light mineral oil (Aldrich).

A third masterbatch formulation was produced with triacetyl alpha cyclodextrin without zinc. The extruder screw design produced compounded material at 23.5 kg per hour and a melt temperature of 265° C. The screws were rotated at 400 rpm at 90% torque. The material then passed through a devolatilization zone (operated at a vacuum of 660 mm Hg) before exiting through a four-hole strand die. The strands pass through a water bath and two air wipes before entering the strand cutter. The finished pellets are placed into a nitrogen purged Mylar/foil composite bag and heat-sealed.

TABLE 1

HDPE masterbatch formulations.

| Masterbatch Formulations | Nanozinc Particle size 80–100 nm | Microzinc Ave. Particle size 9,790 nm | Triacetyl α CD Degree of Substitution = 3.0 |
|---|---|---|---|
| Formulation #1 | 0.35 wt.-% | | 3.5 wt.-% |
| Formulation #2 | | 0.35 wt.-% | 3.5 wt.-% |
| Formulation #3 | | | 3.5 wt.-% |

Masterbatch Compositions (wt.-% in HDPE)

Film Preparation

A series of films using film-grade high density polyethylene resin and the three masterbatch formulations in Table 1 were converted into film (Table 2) by blown film extrusion. The films were blown on a Killion laboratory scale blown film line. The extruder is equipped with a 19 mm diameter (24:1 L/D ratio) screw operated at 72 rpm with an output of 1.8 kg/hour for a 20 μm film thickness and at 122 rpm with an output of 3.6 kg/hour for a 50 μm film thickness. The extruder is flood feed operated with virgin film grade HDPE only as a control, and with masterbatch formulations #1, #2 and #3 which were pre-blended (10:1—wt. to wt.—virgin resin to masterbatch) by mechanical tumbling before use.

The blown film line annular film die has a 31.75-mm diameter and is operated at 270° C. The extruded polymer tube bubble has a diameter of 23 cm for both film thicknesses. The two extruder zones are operated at 238° C. and 240° C., respectively. The extruder to film die adapter is operated at 238° C.

TABLE 2

HDPE blown film test samples.

| Blown Film Ident'n | Masterbatch Formulations | HDPE | Nano-zinc | Micro-zinc | Triacetyl α CD |
|---|---|---|---|---|---|
| Film #1 | | 100% | | | |
| Film #2 | Formulation #1 | 99.615% | 0.035% | | 0.35% |
| Film #3 | Formulation #2 | 99.615% | | 0.035% | 0.35% |
| Film #4 | Formulation #3 | 99.65% | | | 0.35% |

Blown Film Composition (% by wt.)

Film Surface Analysis

Figure 1:
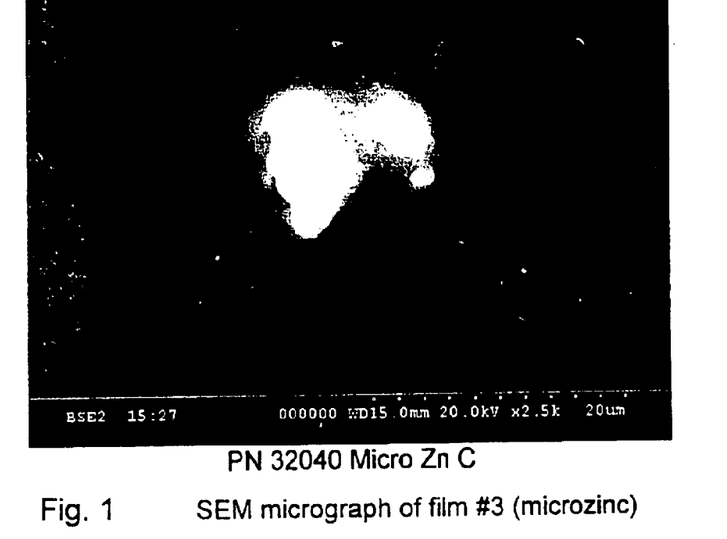
FIG. 1 shows a SEM micrograph of a first film according to an aspect of an exemplary embodiment of the present invention at 2500×magnification.
Figure 2:
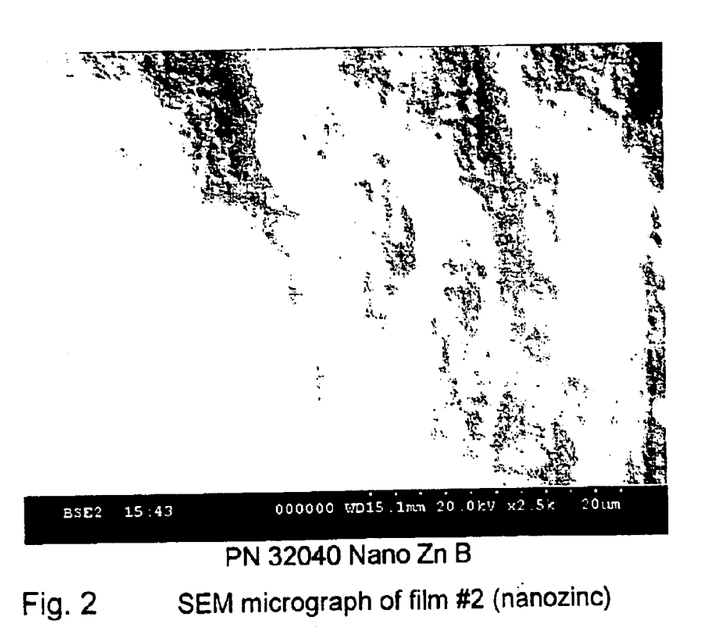
FIG. 2 shows a SEM micrograph of a second film according to an aspect of an exemplary embodiment of the present invention at 2500×magnification.
Figure 3:
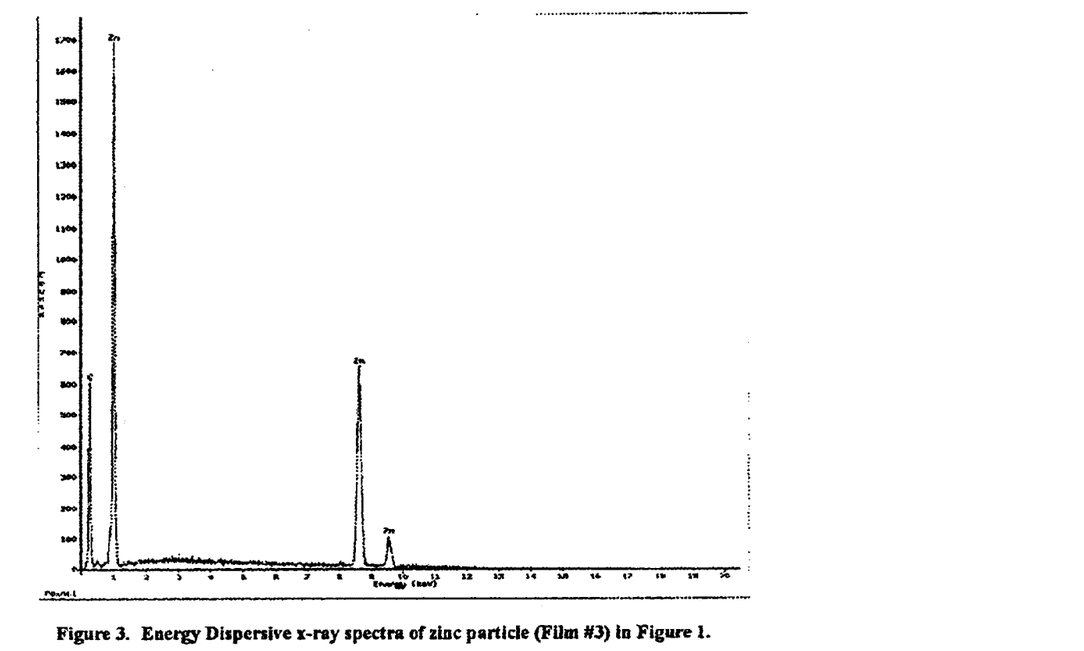
FIG. 3 shows an energy dispersive x-ray spectra of zinc particles in FIG. 1 according to an aspect of an exemplary embodiment of the present invention.

The blown film surfaces were examined for included zinc particles using a variable pressure, scanning electron microscope (SEM), manufactured by Hitachi, operated with an accelerating voltage of 20 Kv. FIGS. 1 and 2 are SEM micrographs of Film #3 (microzinc) and Film #2 (nanozinc) surfaces at 2,500×magnification. The included particles found in the microzinc films by SEM were then analyzed by energy dispersive spectroscopy. The x-ray spectra of the zinc particle shown in FIG. 1 are provided in FIG. 3.

Significant differences in the microzinc and nanozinc film surfaces were found by SEM and these differences are readily visible by comparing the micrographs in FIGS. 1 and 2. The microzinc containing film showed numerous included zinc particles in the film surface. The particle shown in FIG. 1 has a diameter of approximately 6 $\mu$m (6,000 nm). No zinc particles were detected in the nanozinc film surface. The importance of this finding is that included micrometer-size zinc particle in the surface of the film may cause defects such as pinholes and the potential for a complete breach through the entire thickness of the film. Particles in the film surface may allow capillary flow, an undesirable feature in thin, high barrier film.

Static Permeation Testing

Permeation across a barrier can be explained where the membrane at time zero ($t_0$) is initially free from permeant vapor. The penetrant pressure $p_2$ at the upstream face of the membrane is increased giving a concentration in the surface layer $c_2$. Diffusion is a measure of how quickly permeants move in a membrane across the concentration gradient and the time it takes to reach steady state. The downstream pressure, $p_1$, while measurable, is negligible at small times relative to the upstream pressure $p_2$. The amount of vapor permeating the film increases linearly with time once steady state has been reached. At large times, the upstream pressure $p_2$ will equal the downstream pressure $p_1$.

When a gas or vapor permeant does not interact with the polymer in a membrane, the permeability coefficient, P, is usually characteristic for the permeant-polymer system. This is the case with the permeation of many gases such as hydrogen, nitrogen, and oxygen through many polymers. If a permeant interacts with polymer molecules, as is the case with the organic permeants, P is no longer constant and may depend on the pressure, film thickness, and other conditions. In such cases, a single P value does not represent the characteristic permeability of the membrane. Equation 1 shows the dimensions of P to be:

$$P = \frac{\text{(Amount of Permeant)(Film Thickness)}}{\text{(Area)(Time)(Pressure-drop Across the Film)}} \quad (1)$$

In these cases, the transmission rate, Q, is often used for practical purposes when the vapor pressure of the permeant at a specified temperature is applied across a film. Permeability of membranes to water and organic compounds is often expressed this way. Equation 2 shows the dimensions of Q to be:

$$Q = \frac{\text{(Amount of Permeant)(Film Thickness)}}{\text{(Area)(Time)}} \quad (2)$$

A major variable in determining the permeation coefficient is the pressure drop across a film. Since the transmission rate, Q, includes neither permeant pressure nor concentration in its dimensions, knowing either vapor pressure or the concentration of permeant under the measurement conditions is necessary to correlate Q to P. In the closed-volume permeation test method described below, $p_2$ at the upstream face of the film is not held constant since a finite amount of permeant is introduced into the upstream cell. The downstream pressure, $p_1$, is measured and reported as mass flow [parts per million–$\mu$l/L (vol./vol.)] over time.

Figure 4:
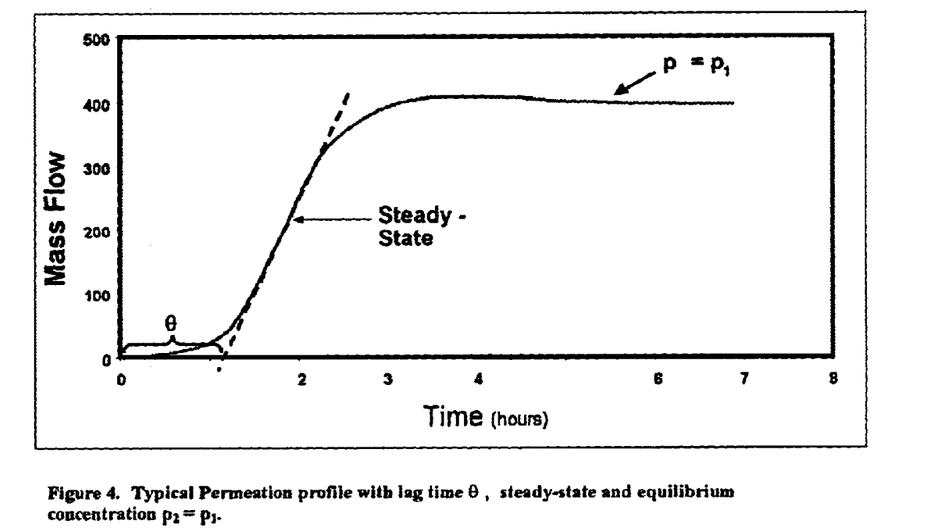
FIG. 4 shows a typical permeation profile according to an aspect of an exemplary embodiment of the present invention.

The amount of vapor permeating the film increases linearly with time once steady state has been reached, as illustrated in FIG. 4. At large times, the upstream pressure $p_2$ will equal the ownstream pressure $p_1$.

If the linear portion of steady-state is extrapolated back to Q=0 where the intercept t=$\theta$ (lag time), then Equation 3 shows the dimensions of D to be:

$$D = \frac{l^2}{6_\theta} \quad (3)$$

From one experiment, the transmission rate can be calculated from the slope of the asymptotic line, the diffusion rate can be calculated from the lag time $\theta$ and the equilibrium concentration $p_2 = p_1$ at large times.

Organic Vapor Permeation

The closed-volume permeation method involves experimental techniques to measure organic molecule transport through a polymer film structure, using a static concentration gradient. High-resolution gas chromatography (HRGC) operated with flame ionization detection (FID) or electron capture detection (ECD) is used to measure the cumulative downstream penetrant concentration.

This method involves experimental techniques designed to measure the flux of a single permeant or co-permeants across the test film. HRGC (Hewett-Packard 5890) operated with an FID or ECD is used to measure the change in the cumulative permeant concentration over time in the downstream cell. Downstream permeants are quantitatively collected by solid phase microextraction (SPME)—purchased from Aldrich Chemical—from the downstream cell and analyzed by HRGC/FID or ECD. The individual permeant concentrations are determined from calibration standards and measured in $\mu$L/L or parts per million (vol./vol.) using gas laws.

Instrument Conditions

The standard concentrations of permeants were prepared by diluting a stock solution containing the test permeant(s) prepared in a 1% Triton X-100 aqueous solution. Working dilutions were prepared so that additions of 1 $\mu$L to 20 $\mu$L of the diluted stock provided the permeant mass to the 1,200 mL upstream cell. The following SPME HRGC/ECD and HRGC/ECD instrument conditions used in the analyses are provided in Table 3.

TABLE 3

Method conditions for gas chromatograph and solid phase microextraction.

| Method: | Co-Permeants | Chloroacetic acid |
|---|---|---|
| Target permeants: | Hexanal Butyric acid Isovaleric acid | Chloroacetic acid |
| Sampling technique: | Solid Phase Microextration (SPME) | Solid Phase Microextration (SPME) |
| Fiber: | Carbowax/ Divinylbenzene (70 mm) | Carbowax/Divinylbenzene (70 mm) |
| Sorb time: | 10 minutes at room temperature | 2 minutes at room temperature |
| Desorb time: | 3 minutes at 250° C. | 1 minute at 220° C. |
| Column: | DB-Wax (J & W) | Retention gap |
| Dimensions: | 30 M × 0.25 mm i.d. | 3 M × 0.25 mm i.d. |
| Film thickness: | 0.25 mm | Uncoated |
| Carrier gas: | Helium | Helium |
| Headpressure: | 22 psi (1 mL/min) | 8 psi (0.35 mL/min) |
| Injection mode: | Split (4.0 mL) | Splitless |
| Detector: | Flame Ionization (FID) | Electron Capture (ECD) |
| Detector temp: | 300° C. | 290° C. (60 mL/min Nitrogen) |

TABLE 3-continued

Method conditions for gas chromatograph and solid phase microextraction.

| Method: | Co-Permeants | Chloroacetic acid |
|---|---|---|
| Injector temp: | 250° C. | 220° C. |
| Initial temp: | 100° C. | 50° C. |
| Initial hold: | 2 minutes | 3 minutes |
| Temperature rate: | 15° C./minute | 0° C./minute |
| Final temperature: | 220° C. | 50° C. |
| Final hold: | 2 minutes | |
| Total analysis time: | 12 minutes | 3 minutes |

Figure 5:
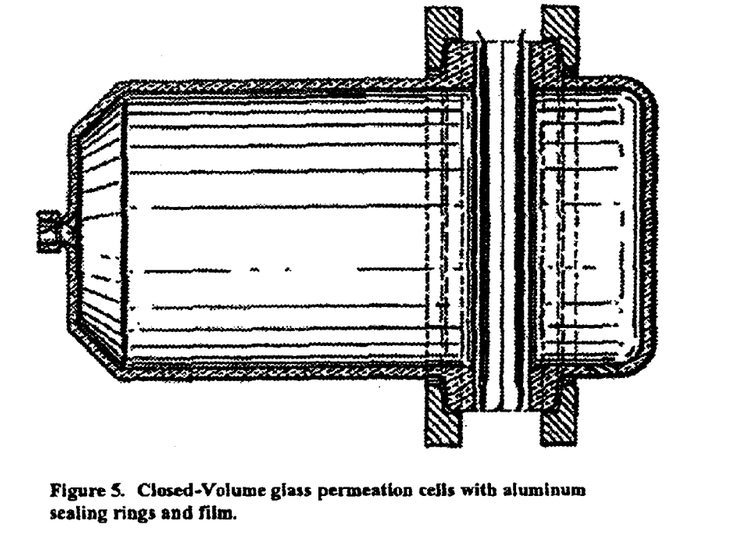
FIG. 5 shows closed-volume glass permeation cells with aluminum sealing rings and film according to an aspect of an exemplary embodiment of the present invention.

Film samples (~20 μm and ~50 μm thick×13.5 cm diameter) are tested in a closed-volume vapor permeation device (refer to FIG. 5). The experimental closed-volume permeation method has two glass compartments (i.e., cells) separated by the film under study (effective film area=143 cm²). The upstream cell has a volume of 1,200-mL and the downstream cell a volume of 280-mL. The test film is placed between the upstream and downstream cells; the cells are assembled using soft, aluminum sealing rings to firmly seal the test film between the glass cell flanges and screws to firmly pull the two cells together. Two permeation standards are prepared. The first permeation standard contains chloroacetic acid. The second permeant standard contains hexanal, butyric acid and isovaleric acid. The individual permeant physical and chemical parameters are provided in Table 4. The permeants are dispersed in a deionized water/surfactant (Triton X100) mixture. The permeant water/surfactant mixture is injected into the larger upstream cell providing a concentration $p_2$ at $t_0$ shown in Tables 6 and 7. Permeant concentration $p_2$ in the downstream cell is expressed in parts per million–μL/L (vol./vol.)—using gas laws

TABLE 4

Table of identifying physical and chemical test permeant parameters.

| Permeant | Molecular Weight | Boiling Point (° C.) | Diffusion[1] D, m²/sec | Dissociation Constants in Aqueous Solutions K | pK | Temp. ° C. |
|---|---|---|---|---|---|---|
| Butyric acid | 88.11 | 162 | 1.54 × 10⁻¹² | 1.54 × 10⁻⁵ | 4.81 | 20 |
| Isovaleric | 102.13 | 176 | 9.02 × | 1.7 × 10⁻⁵ | 4.77 | 25 |

TABLE 4-continued

Table of identifying physical and chemical test permeant parameters.

| Permeant | Molecular Weight | Boiling Point (° C.) | Diffusion[1] D, m²/sec | Dissociation Constants in Aqueous Solutions K | pK | Temp. ° C. |
|---|---|---|---|---|---|---|
| acid | | | 10⁻¹⁴ | | | |
| Chloroacetic acid | 94.50 | 189 | 6.98 × 10⁻¹³ | 1.40 × 10⁻³ | 2.85 | 25 |
| Hexanal | 100.16 | 131 | 9.32 × 10⁻¹³ | NA | NA | |

[1]Calculated by lag time in HDPE blown film.

EXAMPLE 1

Figure 6:
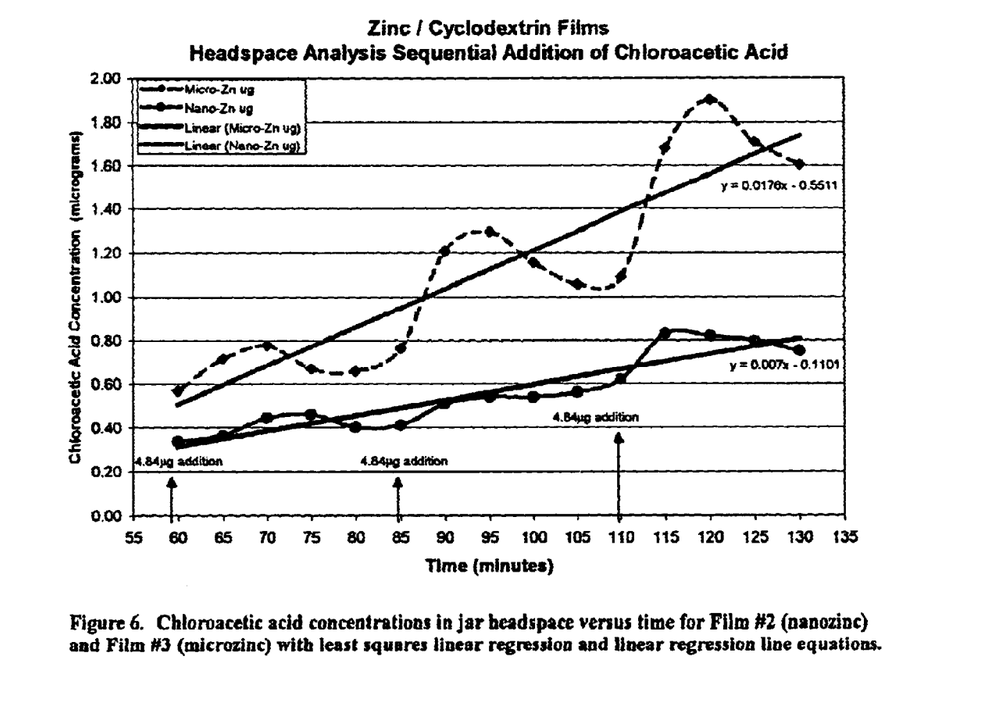
FIG. 6 shows chloroacetic acid concentrations in jar headspace versus time for the second film (nanozine) and the first film (microzibe) according to an aspect of an exemplary embodiment of the present invention.

Quantitative Estimate of Zinc Film Capacities. Film reactivity and capacity was measured by placing zinc containing film curved into a cylinder and placed in a glass jar which is subsequently sealed and filled with a reactive test vapor. The vapor partitions into both sides of the film. In this test, the vapor concentration is measured in the headspace of the glass jar as a function of time. These data are used to make quantitative estimates of how the reactive barrier will perform. The nano- and micro-zinc films in this experiment are identical in weight (1.664 grams) and the areas of the nanozinc film and microzinc film are approximately 384 cm². The effect of the chemical reaction between chloroacetic acid vapor and zinc in the film is a drop in the vapor concentration in the jar. The partition coefficient and diffusion coefficient will be identical for both test films since the HDPE polymer is identical. The test at large times (>60 min.) shows the extent of reaction between the nano- and micro-zinc films and the rate of reaction. The effect of the chemical reaction is to increase uptake of chloroacetic acid in the zinc containing film resulting in a corresponding decrease in the headspace. Four sequential 1-ul injections of chloroacetic acid dissolved in methanol (4.84 μg/μL) were made into the glass jar maintained at 24° C. through a rubber septum. The first injection at time zero was made, then three additional injections were made at 60, 85 and 110 minutes, respectively. The headspace was measure by taking a time composite sample every five minutes after the second chloroacetic acid injection at 60 minutes using a two minute SPME sampling interval beginning at four minutes and ending at six minutes. The downstream SPME samples are analyzed by HRGC/ECD (method conditions Table 3). The results are provided in Table 5 and plotted in FIG. 6.

TABLE 5

Headspace concentration of chloroacetic acid (in μg) as a function of time for jars containing film compositions containing nanozinc (Film #2) and microzinc (Film #3). Four sequential additions of 4.84 μg each of chloroacetic acid was added to sealed jars containing the films at time = 0, 60, 85 and 110 minutes.
Chloroacetic Acid Jar Headspace Concentration
(Headspace concentration in micrograms - μg)

| Chloroacetic acid Additions Elasped Time (min) Sample Conc. | Inj. 60 μg | 65 μg | 70 μg | 75 μg | 80 μg | Inj. 85 μg | 90 μg | 95 μg | 100 μg | 105 μg | Inj. 110 μg | 115 μg | 120 μg | 125 μg | 130 μg |
|---|---|---|---|---|---|---|---|---|---|---|---|---|---|---|---|
| Film #2 (Nanozinc) | 0.336 | 0.363 | 0.443 | 0.460 | 0.400 | 0.409 | 0.507 | 0.540 | 0.539 | 0.560 | 0.617 | 0.829 | 0.819 | 0.798 | 0.750 |
| Film #3 (Microzinc) | 0.569 | 0.713 | 0.775 | 0.666 | 0.656 | 0.763 | 1.21 | 1.30 | 1.15 | 1.06 | 1.09 | 1.68 | 1.90 | 1.71 | 1.60 |

This experiment provides the functional capacity estimates for the nano- and micro-zinc barriers. A least squares linear regression fit to the chloroacetic acid concentrations as a function of time show a 0.0070 μg/min. slope for nanozinc and 0.0176 μg/min. for microzinc. The chloroacetic acid concentration slope is 2.5 times greater for the microzinc film than nanozinc film over the time-period of 60 minutes to 130 minutes. Surprisingly, the amount of chloroacetic acid vapor reduction in the headspace after each sequential injection of 4.84 μg was significantly greater for nanozinc than microzinc (refer to FIG. 6). When chloroacetic acid has a greater chance to collide with a zinc particle during its tortuous diffusion path in the polymer matrix, the greater the reductions per unit time. This is especially important for reactive permeants with fast diffusion coefficients. The example clearly demonstrates that a greater number of smaller particles in a given thin film volume are more significant than larger particles when both zinc particles inside the film volume have identical mass. The effect of a faster chemical reaction rate is to increase permeant uptake during diffusion and in turn greatly retarding transport through the membrane.

EXAMPLE 2

Lag Time Diffusion. This method involves experimental techniques designed to measure trichloroacetic acid flux across a 20 μm test film at small times. HRGC operated with an ECD is used to measure the change in the cumulative chloroacetic acid concentration over time in the upstream cell at 22° C. At one minute and then every five minutes, a time composite sample is collected by SPME from the downstream cell and analyzed by HRGC/ECD using a two minute SPME sampling interval beginning at four minutes and ending at six minutes (method conditions Table 3). The chloroacetic acid concentration is determined from calibration standards. Table 6 contains the concentration $p_2$ of chloroacetic acid in the upstream cell at t=0, and lag time diffusion is based on the linear portion of steady-state chloroacetic acid permeation extrapolated back to the time axis for Film #1 (control), Film #2 (nanozinc), Film #3 (microzinc) and Film #4 (triacetyl αcyclodextrin).

TABLE 6

Lag time diffusion of chloroacetic acid measured by static permeation using headspace HRGC/ECD in Film #1 (control), Film #2 (nanozinc) and Film #3 (microzinc). The permeation cell temperature is maintained at 22° C. and film thickness 20 μm.

| Permeant | Conc. $p_2$ at Time = 0 All Samples nL/L | Lag Time Diffusion (Film thickness = 20 μm) | | |
|---|---|---|---|---|
| | | Film #1 (control) D, m²/sec | Film #2 (nanozinc) D, m²/sec | Film #3 (microzinc) D, m²/sec |
| Chloroacetic acid | 144.6 | $6.98 \times 10^{-13}$ | $8.40 \times 10^{-14}$ | $1.44 \times 10^{-13}$ | nL/L Parts Per Billion

Table 6 shows chloroacetic acid lag time diffusion for microzinc is 4.8 times greater than Film #1 (control) while Film #2 (nanozinc) showed a significantly greater lag time of 8.3 times greater than the Film #1 (control). Film #2's lag time is 1.7 times greater than the Film #3's lag time for chloroacetic acid. The effect of the nano-size zinc is a significant increase in lag time diffusion by retarding the transport of chloroacetic acid in the film.

EXAMPLE 3

Example 3 shows how the results provided in Examples 1 and 2 can be combined with other characteristics of diffusion to demonstrate how better barrier films can be made with nanozinc. This method involves experimental techniques designed to measure the flux of three co-permeants (hexanal, butyric acid and isovaleric acid) across a 50 μm test film. HRGC operated with an FID is used to measure the change in the cumulative co-permeant concentration over time in the upstream cell. Every thirty minutes, a time composite sample is collected by SPME from the downstream cell and analyzed by HRGC/FID using a fifteen minute SPME sampling interval beginning at 90 minutes and ending at 105 minutes (sampling interval midpoint 97.5 minutes) then every thirty minutes thereafter to 247.5 minutes and the final sampling midpoint interval at 1,447.5 minutes. The hexanal, butyric acid and isovaleric acid concentration is determined from calibration standards and measured in μL/L or parts per Million (vol./vol.) using gas laws. Table 7 contains each co-permeant concentration $p_2$ in the downstream cell at t=0 and the cumulative penetrant concentration downstream of each of the co-permeants. The cumulative permeant concentrations in Table 7 are plotted as a function of time in FIGS. 7, 8 and 9.

TABLE 7

Co-permeants (hexanal, butyric and isovaleric acids) measured by static permeation using headspace HRGC/ECD in Film #1 (control), Film #2 (nanozinc), Film #3 (microzinc) and Film #4 (triacetyl-α-CD). The permeation cell temperature maintained at 22° C. and film thickness 50 μm.

| Hexanal Conc. $p_2$ at Time = 0 | Hexanal Concentration (μL/L) - $p_1$ at Time (Film thickness = 50 μm) | | | |
|---|---|---|---|---|
| 0.400 μL/L Time (min.) | Film #1 (control) | Film #2 (nanozinc) | Film #3 (microzinc) | Film #4 (TA-α-CD) |
| 97.5 | 0.025 | 0.028 | 0.032 | 0.018 |
| 127.5 | 0.033 | 0.033 | 0.039 | 0.020 |
| 187.5 | 0.060 | 0.052 | 0.052 | 0.025 |
| 247.5 | 0.069 | 0.065 | 0.077 | 0.028 |
| 1447.5 | 0.174 | 0.112 | 0.089 | 0.029 |
| Butyric Conc. $p_2$ at Time = 0, | Butyric Acid Concentration (μL/L) - $p_1$ at Time (Film thickness = 50 μm) | | | |
| 6.08 μL/L Time (min.) | Film #1 (control) | Film #2 (nanozinc) | Film #3 (microzinc) | Film #4 (TA-α-CD) |
| 97.5 | 0.432 | 0.337 | 0.621 | 0.817 |
| 127.5 | 0.529 | 0.336 | 0.649 | 0.837 |
| 187.5 | 0.698 | 0.383 | 0.712 | 0.946 |
| 247.5 | 0.710 | 0.418 | 0.829 | 1.05 |
| 1447.5 | 0.786 | 0.425 | 1.20 | 0.952 |
| Isovaleric Conc. $p_2$ at Time = 0, | Isovaleric Acid Concentration (μL/L) - $p_1$ at Time (Film thickness = 50 μm) | | | |
| 6.15 μL/L Time (min.) | Film #1 (control) | Film #2 (nanozinc) | Film #3 (microzinc) | Film #4 (TA-α-CD) |
| 97.5 | 0.313 | 0.042 | 0.051 | 0.210 |
| 127.5 | 0.340 | 0.056 | 0.115 | 0.224 |
| 187.5 | 0.384 | 0.092 | 0.233 | 0.271 |
| 247.5 | 0.447 | 0.130 | 0.260 | 0.317 |
| 1447.5 | 0.636 | 0.085 | 0.356 | 0.524 |

ML/L = Parts Per Million (vol./vol.)

The functional performance of the four films in Table 7 are evaluated with the focus on small times when the films just begins to leak. At large times when the equilibrium concentration $p_2=p_1$, the barrier isn't effective anymore. The rate of diffusion is governed both by the permeability of the barrier polymer and by the tortuosity of the diffusing permeant's diffusion. The lag time is influenced both by these characteristics and by the barrier's reactivity. Therefore, a better barrier is developed by changing the barrier's permeability, its tortuosity, or its reactivity. Table 7 provides the test results demonstrating these principles either by decreasing the rate of organic permeation across a HDPE film or by increasing the lag time that it take organic permeants to cross the HDPE film.

Figure 7:
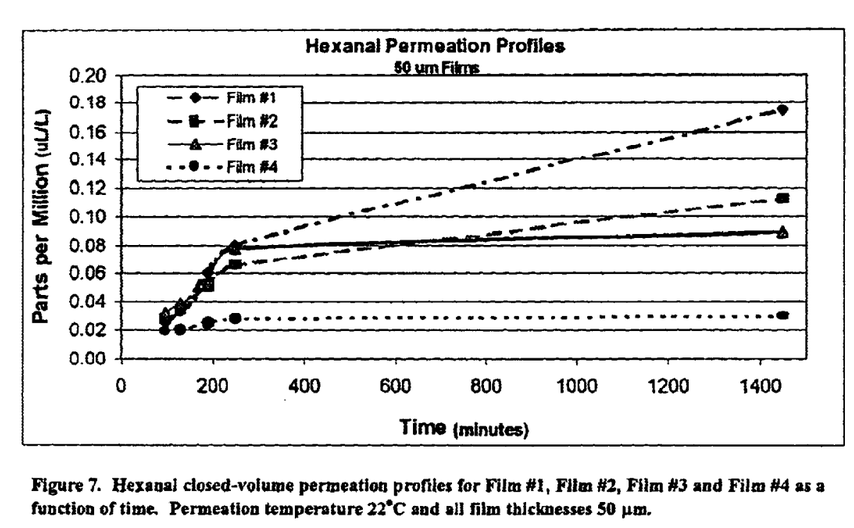
FIG. 7 shows hexanal closed-volume permeation profiles according to an aspect of an exemplary embodiment of the present invention.
Figure 8:
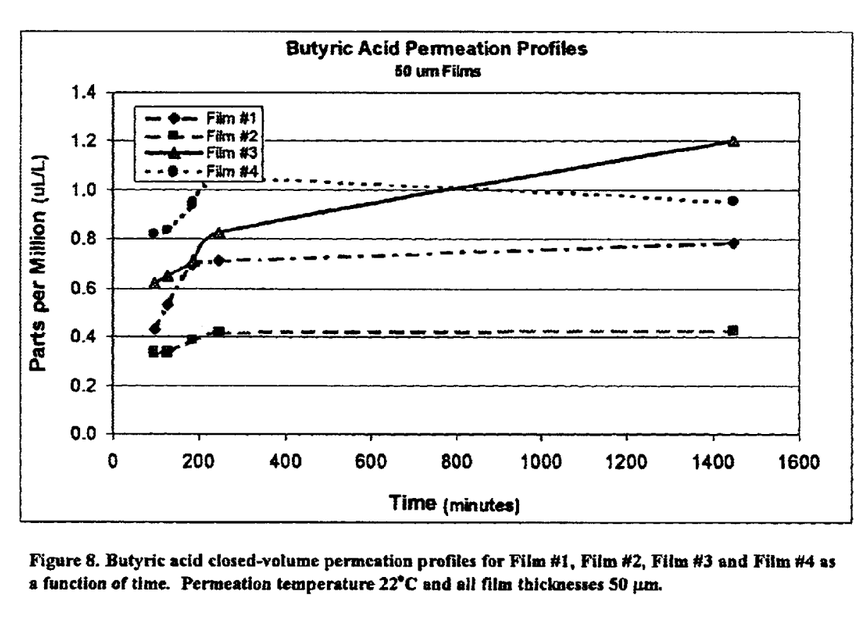
FIG. 8 shows butyric acid closed-volume permeation profiles of films according to an aspect of an exemplary embodiment of the present invention.

The first co-permeant, Hexanal, is a non-reactive permeant with regard to zinc but is trapped (complexed) by cyclodextrin. FIG. 7 clearly shows Film #4 (TA-α-CD) has a longer lag time, smaller steady-state permeation slope and at large times a significant reduction in equilibrium. Film #2 and Film #3 have similar small time and large time functionality. In all cases, Film #'s 2, 3 and 4 are all have better barrier performance than the Film #1 (control). The second co-permeant, butyric acid, is a reactive permeant with regard to the reactive zinc but is not trapped (complexed) by the cyclodextrin. Butyric acid diffuses the fastest of the three permeants and its dissociation constant (pK=4.81)) is greater than isovaleric (pK=4.81) and chloroacetic acid (pK=2.85). The difference in reactivity of Film #2 (nanozinc) is significantly greater than Film #3 (microzinc) as shown in FIG. 8. The reaction rate (i.e., the amount of chemical change per time) between the permeant and zinc forming a new immobile permeant inside the film is very important. If the permeant diffuses rapidly and the reaction is slow, than only small or no changes will be observed in the permeation profile. Film #3's (microzinc) barrier performance is poorer than Film #1 (control), while Film #2 (nanozinc) shows significantly improved barrier performance. The poor butyric acid barrier performance for Film #3 (microzinc) is related to pinholes, surface defects and other imperfections in the blown films caused by the micron size zinc particles altering the intrinsic barrier properties of the HDPE.

Figure 9:
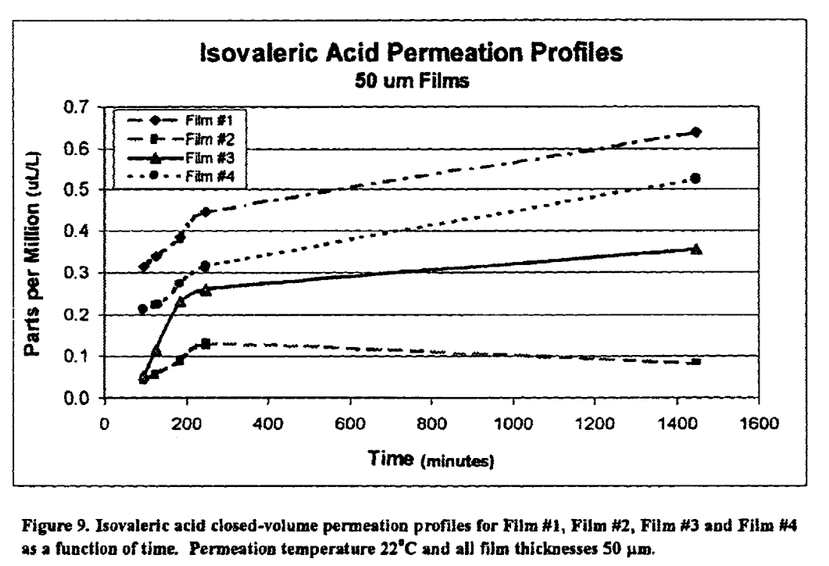
FIG. 9 shows isovaleric acid closed-volume permeation profiles according to an aspect of an exemplary embodiment of the present invention.

The third co-permeant, isovaleric acid, is a reactive permeant with regard to zinc and is trapped (complexed) by the cyclodextrin to some level. Isovaleric acid diffuses the slowest of the three permeants and its dissociation constant (pK) is smaller than butyric acid but greater than chloroacetic acid. The difference in reactivity of Film #2 (nanozinc) is again significantly greater than Film #3 (microzinc) as shown in FIG. 9. The slower diffusion rate of the isovaleric acid and the lower dissociation constant (pK) improves its reactivity with Film #3 (microzinc) compared to butyric acid. Film #3's (microzinc) barrier performance is significantly poorer than Film #2 (nanozinc). In all cases, Film #'s 2, 3 and 4 all have better barrier performance than Film #1 (control).

EXAMPLE 4

Sensory Evaluation of Film Malodour Permeation. A synthetic diaper malodour concentrate (produced by Bush Bake Allen, Ltd.) was used to evaluate the odour performance barrier of the blown films in Table 1. Analysis of the "neat" malodour concentrate by gas chromatography mass spectrometry indicated approximately fifteen major compounds (Table 8). The general classes of chemicals contained in the synthetic malodour are organic acids, sulfur, nitrogen and aromatic alcohol compounds. Most of the compounds identified in Table 7 have human sensory thresholds in the low parts per billion, and for one compound, 3-methylindole (skatole), a threshold in the low parts per trillion.

TABLE 8

Compounds identified in synthetic malodour by gas chromatography mass spectrometry.

| Organic Acids | Sulfur | Nitrogen | Aromatic Alcohol |
|---|---|---|---|
| Acetic acid | Carbon disulfide | Ammonia | 4-Methylphenol |
| Butyric acid | Mercaptoacetic acid | 4-Methylmorpholine | |
| Isovaleric acid | 2-Naphthalenethiole | 4-Methyl-4-oxide morpholine | |
| Hexanoic acid | | Dimethylhydantoin | |
| Octanoic acid | | 3-Methylindole Hexanamide | |

Detection of the synthetic diaper malodour compounds in the standard static permeation test at concentrations that represent real world unpleasant sensory values is not feasible because the human sensory threshold for these compounds is well below the detection limits of these compounds by instrumental methods of analysis. The instrumental analytical techniques for static permeation were abandoned and sensory techniques (i.e., human nose) were substituted in their place.

Figure 10:
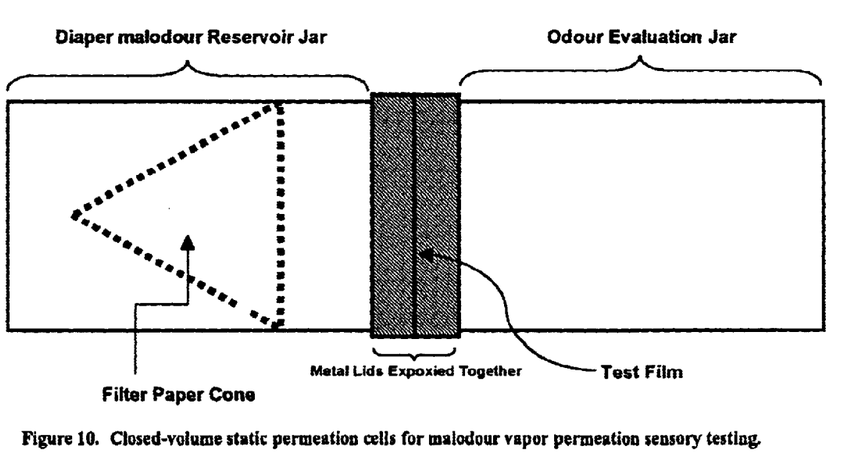
FIG. 10 shows closed-volume static permeation cells for malodour vapor permeation sensory testing according to an aspect of an exemplary embodiment of the present invention.

Experimental film diaper malodour reduction performance was measured in static permeation cells constructed from Mason brand glass canning jars. Each jar has a volume of approximately 450-ml. Two screw cap lids are attached top-to-top with epoxy adhesive allowing the two jars to be attached as shown in FIG. 10. One of the jars serves as a reservoir for the diaper malodour and attachment of the film by placing the film over the jar mouth and screwing the lid over the film. The other jar serves as a collection reservoir for the permeating malodour compounds. This jar is screwed to the opposing lid and is removed periodically during the test to evaluate odour. Teflon tape is used on the glass jar threads prior to assembly to securely seal the jars during the test. The malodour sensory scores are plotted over time to obtain a malodour permeation profile.

The diaper malodour concentrate was diluted 1,500× in deionized water. Five (5) milliliters of the malodour dilution is transferred to a filter paper cone in the malodour reservoir side. Next, the test film is placed over the open end of the jar with approximately 3.5-cm of film extending beyond the jar's lip. Then the double-sided cap is screwed down tightly followed by the odour evaluation jar. After the film has been sealed by the screw cap, the film extending beyond the screw cap on the outside of the jar is trimmed-off. Five (5) milliliters of the dilution correspond to a mass of active malodour compounds of approximately 650 μg. The mass of active malodour compounds injected is greater than the capacity of the test film used in the method. Large deionized water dilutions of the malodour were made to provide for high water vapor concentrations in the malodour reservoir side to simulate the environment inside a diaper storage bag. The odour evaluation jar is unscrewed and evaluated for odour and quickly replaced. Eight (8) odour evaluations are made over the 24-hour test period for malodour intensity. Films were evaluated more frequently the first three hours (once per hour) to establish an estimated lag time diffusion and then at six, eight, fourteen, twenty and twenty-six hours. An eight point category scale from 0=no malodour to 8=very strong malodour was used. Film malodour sensory scores and the graphed profiles versus time for the four film samples is plotted in FIG. 11.

TABLE 11

| | Diaper Malodour Sensory Score* (Film thickness = 50 μm) | | | |
|---|---|---|---|---|
| Time (min.) | Film #1 (control) | Film #2 (nanozinc) | Film #3 (microzinc) | Film #4 (TA-α-CD) |
| 60 | 0.5 | 0 | 1 | 0 |
| 120 | 1.0 | 0 | 1.5 | 1.0 |
| 180 | 1.5 | 0 | 2.5 | 1.0 |
| 300 | 3.0 | 1.5 | 3.0 | 2.0 |
| 840 | 4.0 | 2.0 | 3.0 | 2.0 |
| 1200 | 4.5 | 3.0 | 5.0 | 4.0 |
| 1560 | 5.5 | 3.0 | 5.0 | 4.0 |

Key:
0 = no odour;
1 = Just detectable odour;
2 = Very slight odour;
3 = Slight odour;
4 = Slight-Moderate odour;
5 = Moderate odour;
6 = Moderate-Strong odour;
7 = Strong odour;
8 = Very strong odour
*Average of replicate tests.

Figure 11:
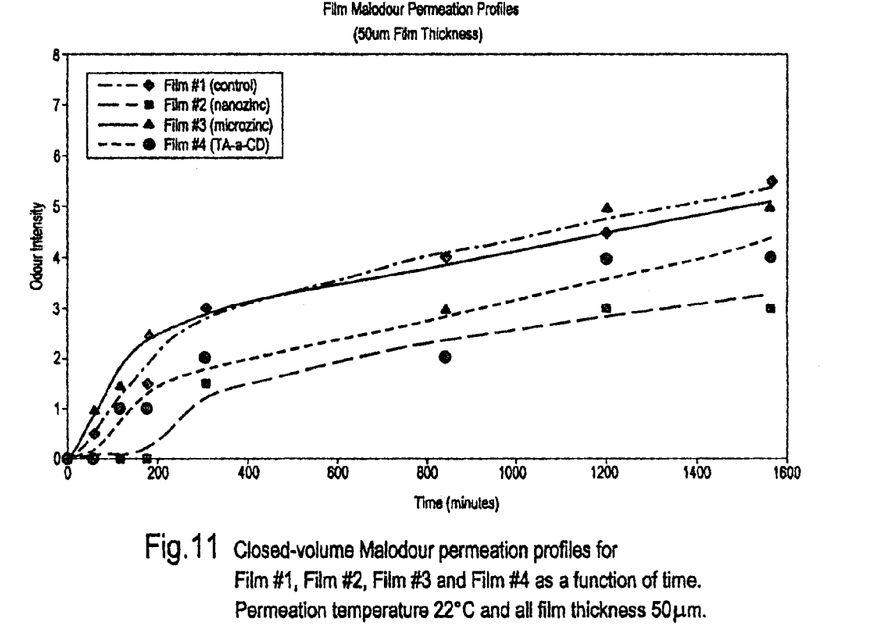
FIG. 11 shows closed-volume malodour permeation profiles according to an aspect of an exemplary embodiment of the present invention.

The tests results in Table 11 show a significant improvement for Film #2 (nanozinc) over Film #1 (control) both in lag time diffusion (more than a 5× improvement) as well as equilibrium permeation (approximately a 1.8× improvement) after 26 hours. Lag time diffusion is the most critical since retarding malodour permeation, not just reducing malodour, will mean that it is less likely a diaper storage bag, for example, can emit odours over time that will contaminate the temporary storage pail or nursery areas. The film malodour sensory profiles in FIG. 11 show Film #3 (microzinc) to have a poorer lag time and similar equilibrium profile than Film #1 (control). This result is unexpected and is more clearly shown in this test—and is associated with both the type of permeants as well as the lower human detection of the permeants than instrumental detection—than in Example 3. The poor malodour performance for Film #3 (microzinc) is believed to be related to pinholes, surface defects and other imperfections in the blown films caused by the microzinc particles reducing the intrinsic barrier properties of the HDPE. The combination of a reactive nanozinc barrier and an active cyclodextrin barrier has been shown to retard diffusing organic permeants significantly better than cyclodextrin alone or microzinc and cyclodextrin.

What is claimed is:

1. A material having improved barrier properties, the material comprising:
   (a) a thermoplastic matrix material; and
   (b) an effective absorbing amount of a cyclodextrin material dispersed in the matrix material;
   wherein the cyclodextrin is free of an inclusion complex compound, the cyclodextrin is dispersed in the matrix material by extrusion, and the cyclodextrin comprises an α-cyclodextrin, a β-cyclodextrin, a γ-cyclodextrin or mixtures thereof, having pendant moieties or substituents that render the cyclodextrin compatible with the matrix material, and nanosized particles of elemental zinc, said nanosized particles being essentially free of corresponding oxides.

2. The material of claim 1, wherein the nanosized particles of elemental zinc, have an average diameter in the range of 10 to 250 nm.

3. The material of claim 1, wherein the nanosized particles of elemental zinc, alkaline earth metal or transition metal have an average diameter in the range of 40 to 120 nm.

4. The material of claim 1, wherein the nanosized particles of elemental zinc, have an average diameter in the range of 60 to 100 nm.

5. The material of claim 1, wherein the thermoplastic material has a form selected from the group consisting of a thermoplastic film, a sealing liner, a thermoplastic cap a rigid container, and extrusion coated paperboard.

6. The material of claim 1, wherein the thermoplastic material is selected from the group consisting of polyolefnes, polyester, polyamides, ethylene-vinyl alcohol-copolymers, ethylene vinyl acetate copolymers, polystyrene, polystyrene copolymers, polyvinyl chloride, polyvinyliderie chloride, vinyl chloride-co-vinyl acetate copolymers and polyether ketones.

7. The material of claim 1, wherein the thermoplastic material comprises a polyolefine selected from the group consisting of high density polyethylene (HDPE), low density polyethylene (LDPE) and linear low density polyethylene (LLDPE) and a compound selected from the group consisting of polyester, polyamides and ethylene-vinylalcohol-copolymers.

8. The material of claim 1, wherein the amount of cyolodextrin material in the matrix material is in the range from about 0.01 to 5 wt.-% or from about 0.1 to 1 wt.-%, based on the matrix material.

9. The material of claim 1, wherein the cyclodextrin material has a low moisture content of about 1 wt.-%, based on the cyclodextrin material.

10. The material of claim 1, wherein the amount of nanosized particles of elemental zinc, in the matrix material is in the range from about 0.01 to 5 wt.-% based on the matrix material.

11. The material of claim 1, wherein the cyclodextrin material comprises at least one substituent selected from the group consisting of a silyl ether group, an alkyl ether group and an alkyl ester group.

12. The material of claim 1, wherein the cyclodextrin material comprises substituents having an alkyl ester group.

13. The material of claim 12, wherein the substituents having the alkyl ester group comprise at least one moiety selected from the group consisting of acetyl moieties, propyl moieties and butyl moieties.

14. The material of claim 1, wherein the cyclodextnin material comprises substituents having an alkyl ether group.

15. The material of claim 14, wherein the substituents having the alkyl ether group comprise at least one moiety selected from the group consisting of methyl moieties, ethyl moeties and propyl moieties.

16. The material of claim 1, wherein the cyclodextrin material comprises substituents having a silyl ether group.

17. The material of claim 16, wherein the substituents having the silyl ether group comprise at least one moiety selected from the group consisting of methyl moieties, ethyl moieties, propyl moieties and butyl moieties.

18. The material of claim 1, wherein the material comprises at least two layers, wherein at least one first layer of the at least two layers comprises a matrix material, a cyclodextrin material and nanosized particles of zinc.

19. The material of claim 18, wherein the at least one first layer of the at least two layers comprising the cyclodextrin material is a laminate film layer.

20. The material of claim 1, wherein the material has a form selected from the group consisting of a monolayer film, a bilayer film, a multiplayer film an extrusion coated paperboard, an extrusion coated metal foil and cellulosic web/film laminate;
   wherein the cyclodextrin material is part of the monolayer film, the bilayer film and the multiplayer film;
   wherein the cyclodextrin material is part of one or more second extrusion coatings on a surface or both surfaces of the paperboard and the metal foil; and
   wherein the cyclodextrin material is part of the film of the cellulosic web/film laminate.

* * * * *

UNITED STATES PATENT AND TRADEMARK OFFICE
CERTIFICATE OF CORRECTION

PATENT NO. : 6,894,085 B2
DATED : May 17, 2005
INVENTOR(S) : Neil Beaverson and Willard Wood It is certified that error appears in the above-identified patent and that said Letters Patent is hereby corrected as shown below:

Column 22,
Line 7, replace "polyolefnes" with -- polyolefines --.
Line 9, replace "polyvinyliderie" with -- polyvinylidene --.
Line 18, replace "cyolodextrin" with -- cyclodextrin --.
Line 37, replace "cyclodextnin" with -- cyclodextrin --.
Line 57, replace "multiplayer" with -- multilayer --.
Line 60, replace "multiplayer" with -- multilayer --.

Signed and Sealed this

Thirty-first Day of January, 2006

JON W. DUDAS
*Director of the United States Patent and Trademark Office*